United States Patent
Kuo

(10) Patent No.: US 9,560,559 B2
(45) Date of Patent: Jan. 31, 2017

(54) METHOD AND APPARATUS FOR IMPLEMENTING SMALL CELL ENHANCEMENTS IN A WIRELESS COMMUNICATION SYSTEM

(71) Applicant: INNOVATIVE SONIC CORPORATION, Taipei (TW)

(72) Inventor: Richard Lee-Chee Kuo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 0 days.

(21) Appl. No.: 14/167,317

(22) Filed: Jan. 29, 2014

(65) Prior Publication Data

US 2014/0228027 A1  Aug. 14, 2014

Related U.S. Application Data

(60) Provisional application No. 61/762,414, filed on Feb. 8, 2013.

(51) Int. Cl.
| | |
|---|---|
| *H04W 36/00* | (2009.01) |
| *H04W 24/10* | (2009.01) |
| *H04W 72/04* | (2009.01) |
| *H04W 84/04* | (2009.01) |

(52) U.S. Cl.
CPC ......... *H04W 36/0088* (2013.01); *H04W 24/10* (2013.01); *H04W 72/04* (2013.01); *H04W 84/045* (2013.01)

(58) Field of Classification Search
CPC .... H04W 84/045; H04W 24/10; H04W 48/16; H04W 36/0083; H04W 36/0094; H04W 24/02; H04W 36/0088; H04W 48/08; H04W 72/00; H04W 36/04; H04W 36/0066; H04W 88/08; H04W 36/00; H04W 36/026; H04W 36/14; H04W 72/1273; H04J 11/0069; H04L 1/0027
USPC ........................... 455/436–444; 370/331–333
See application file for complete search history.

(56) References Cited

U.S. PATENT DOCUMENTS

| | | | |
|---|---|---|---|
| 2012/0088516 A1* | 4/2012 | Ji et al. ...................... | 455/452.1 |
| 2012/0165020 A1* | 6/2012 | Iwamura ........... | H04W 36/0094 455/436 |
| 2012/0315908 A1* | 12/2012 | Li ................................ | 455/436 |
| 2015/0017993 A1* | 1/2015 | Ishii .............................. | 455/444 |

OTHER PUBLICATIONS

3GPP TSG RAN WG2 Meeting #75, Athens, Greece, Aug. 22-26, 2011 (R2-114123).

(Continued)

*Primary Examiner* — Allahyar Kasraian
(74) *Attorney, Agent, or Firm* — Blue Capital Law Firm, P.C.

(57) ABSTRACT

A method and apparatus for implementing small cell enhancements in a wireless communication system are disclosed. The method includes a first eNB (evolved Node B) controlling a first cell, wherein the first cell is serving a UE (User Equipment). The method further includes the first eNB configuring a second cell to serve the UE, wherein the second cell is controlled by a second eNB. The method also includes the first eNB allocating a measurement gap configuration to the UE. In addition, the method includes the first eNB sending the measurement gap configuration to the second eNB.

11 Claims, 5 Drawing Sheets

(56) References Cited

OTHER PUBLICATIONS

3GPP TSG RAN WG2 Meeting #75bis, Zhuhai, China, Oct. 10-14, 2011 (R2-114947).
3GPP TSG RAN WG2 Meeting #81, Malta, Jan. 28-Feb. 1, 2013 (R2-130451).
3GPP TSG RAN WG2 Meeting #81, Malta, Jan. 28-Feb. 1, 2013 (R2-130658).
3GPP TSG-RAN2 Meeting #83bis, Ljuljana, Slovenia, Oct. 7-11, 2013 (R2-133292).
Search Report on corresponding EP Patent Application No. 14153595.5 dated Mar. 31, 2014.

* cited by examiner

METHOD AND APPARATUS FOR IMPLEMENTING SMALL CELL ENHANCEMENTS IN A WIRELESS COMMUNICATION SYSTEM

CROSS-REFERENCE TO RELATED APPLICATIONS

The present Application claims the benefit of U.S. Provisional Patent Application Ser. No. 61/762,414 filed on Feb. 8, 2013, the entire disclosures of which is incorporated herein by reference.

FIELD

This disclosure generally relates to wireless communication networks, and more particularly, to a method and apparatus for implementing small cell enhancements in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus for implementing small cell enhancements in a wireless communication system are disclosed. The method includes a first eNB (evolved Node B) controlling a first cell, wherein the first cell is serving a UE (User Equipment). The method further includes the first eNB configuring a second cell to serve the UE, wherein the second cell is controlled by a second eNB. The method also includes the first eNB allocating a measurement gap configuration to the UE. In addition, the method includes the first eNB sending the measurement gap configuration to the second eNB.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. TS 36.321 V11.1.0, "E-UTRA MAC protocol specification (Release 11)"; TS 36.331 V11.2.0, "E-UTRA RRC protocol specification (Release 11)"; RP-122033, "Study on Small Cell enhancements for E-UTRA and E-UTRAN—Higher-layer aspects"; and TR 36.932 v12.0.0, "Scenarios and Requirements for Small Cell Enhancements for E-UTRA and E-UTRAN". The standards and documents listed above are hereby expressly incorporated herein.

Figure 1:
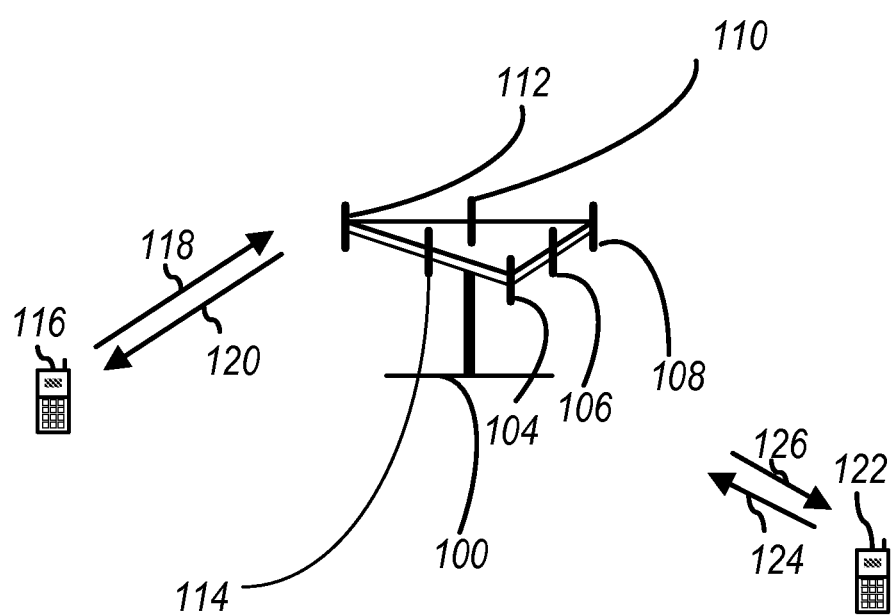
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
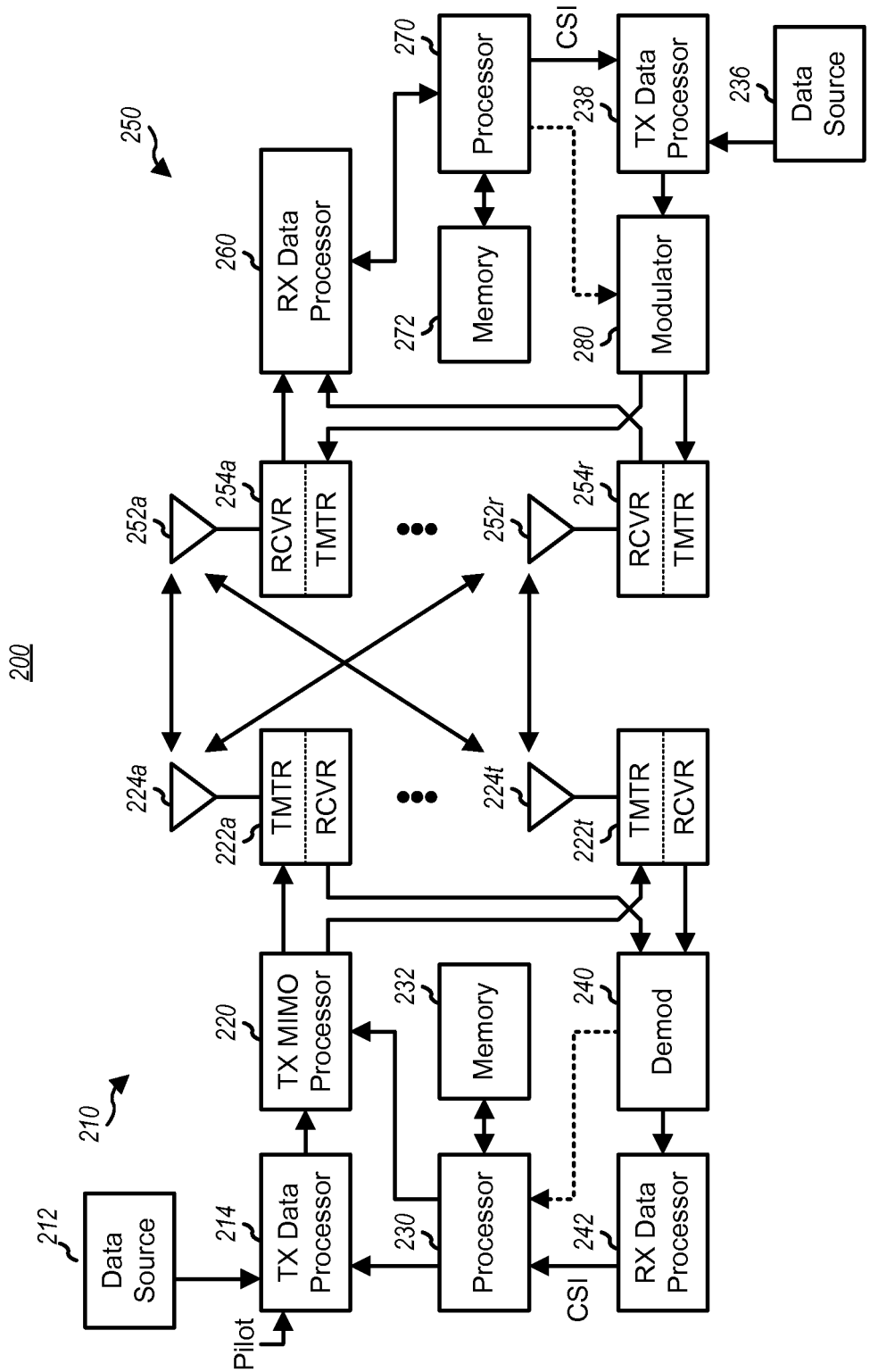
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
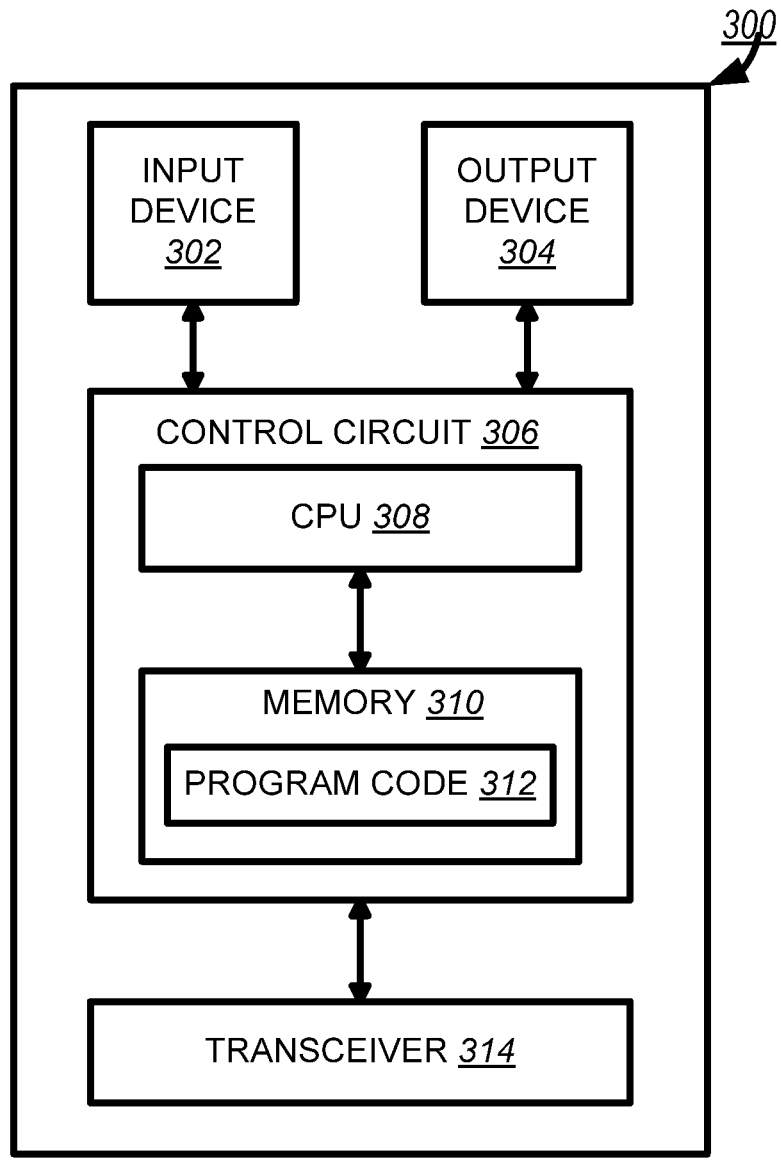
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
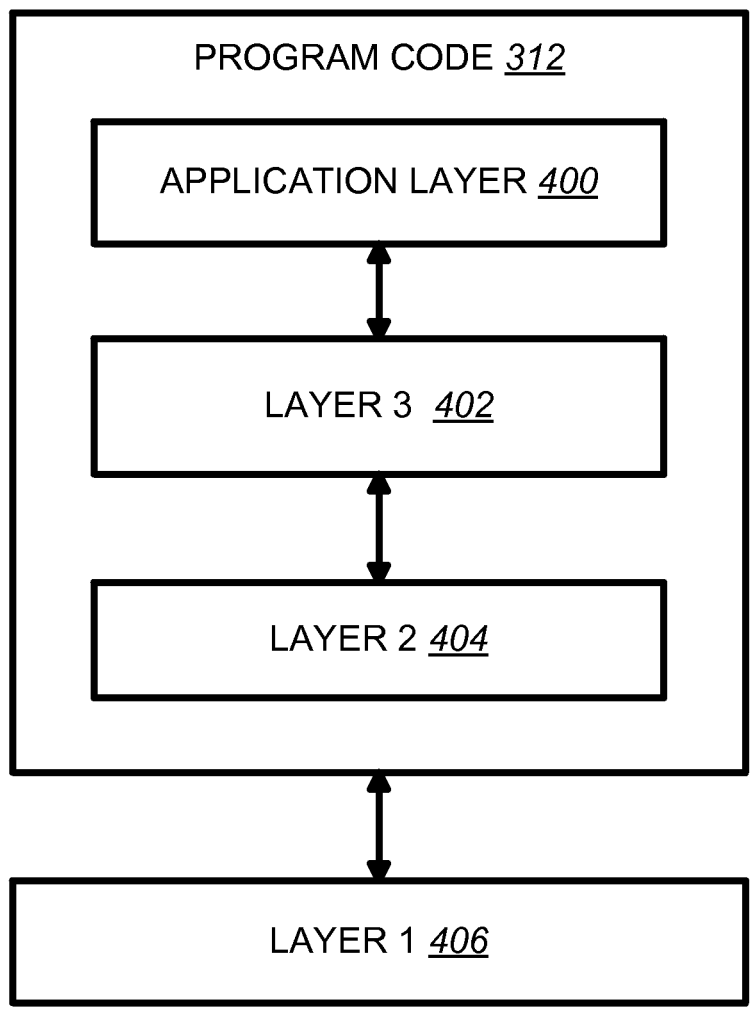
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Carrier Aggregation (CA) is generally a feature to support wider bandwidth in LTE-Advanced (LTE-A). Depending on its capabilities, a terminal could simultaneously receive or transmit on one or multiple component carriers.

In addition to a primary serving cell (PCell), a UE in RRC_CONNECTED mode could be configured with other secondary serving cells (SCell). The PCell is considered as always activated, while an Activation/Deactivation MAC control Element (CE) can be used to activate or deactivate an SCell (as discussed in 3GPP TS 36.321 V11.1.0). Also, an sCellDeactivationTimer corresponding to the SCell could be used for SCell status maintenance (i.e., when the sCellDeactivationTimer expires). The corresponding SCell is implicitly considered as deactivated. A configured SCell could contain downlink (DL) resources only (i.e., a DL CC) or DL resources as well as uplink (UL) resources (such as a DL CC and an UL CC) as discussed in 3GPP TS 36.331 V11.2.0.

3GPP RP-122033 generally describes a new study item on small cell enhancements for Release-12. The objective of the study item is described in 3GPP RP-122033 as follows:

4 Objective

The objective of this study is to identify potential technologies in the protocol and architecture for enhanced support of small cell deployment and operation which should satisfy scenarios and requirements defined in TR 36.932.

The study shall be conducted on the following aspects:

Identify and evaluate the benefits of UEs having dual connectivity to macro and small cell layers served by different or same carrier and for which scenarios such dual connectivity is feasible and beneficial.

Identify and evaluate potential architecture and protocol enhancements for the scenarios in TR 36.932 and in particular for the feasible scenario of dual connectivity and minimize core network impacts if feasible, including:

Overall structure of control and user plane and their relation to each other, e.g., supporting C-plane and U-plane in different nodes, termination of different protocol layers, etc.

Identify and evaluate the necessity of overall Radio Resource Management structure and mobility enhancements for small cell deployments:

Mobility mechanisms for minimizing inter-node UE context transfer and signalling towards the core network.

Measurement and cell identification enhancements while minimizing increased UE battery consumption.

For each potential enhancement, the gain, complexity and specification impact should be assessed.

The study shall focus on potential enhancements which are not covered by other SI/WIs.

In general, 3GPP TR 36.932 captures the scenarios and requirements for small cell enhancements. In particular, Section 6.1.3 of 3GPP TR 36.932 describes ideal and non-ideal backhaul and also raises the need to study interfaces between macro and small cell as follows:

6.1.3 Ideal and Non-Ideal Backhaul

Both ideal backhaul (i.e., very high throughput and very low latency backhaul such as dedicated point-to-point connection using optical fiber, LOS microwave) and non-ideal backhaul (i.e., typical backhaul widely used in the market such as xDSL, NLOS microwave, and other backhauls like relaying) should be studied. The performance-cost trade-off should be taken into account.

A categorization of non-ideal backhaul based on operator inputs is listed in Table 6.1-1:

TABLE 6.1-1

Categorization of non-ideal backhaul

| Backhaul Technology | Latency (One way) | Throughput | Priority (1 is the highest) |
|---|---|---|---|
| Fiber Access 1 | 10-30 ms | 10M-10 Gbps | 1 |
| Fiber Access 2 | 5-10 ms | 100-1000 Mbps | 2 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps typical, maybe up to Gbps range | 1 |

A categorization of good to ideal backhaul based on operator inputs is listed in Table 6.1-2:

TABLE 6.1-2

Categorization of good to ideal backhaul

| Backhaul Technology | Latency (One way) | Throughput | Priority (1 is the highest) |
|---|---|---|---|
| Fiber | 2-5 ms | 50M-10 Gbps | 1 |

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Based on 3GPP RP-122033, the description of the study item of small cell enhancements proposes to study supporting C-plane and U-plane in different nodes for dual connectivity, which implies the C-plane goes through the macro cell and the U-plane goes through the small cell. In the RAN2#81 meeting, several contributions propose to keep part of U-plane (e.g., real time services) in the macro cell.

When separate eNBs are used to support dual connectivity, a new interface between the macro eNB and the small cell eNB would need to be specified. Also, the information to be exchanged over this new interface would need to be defined.

Similar to Rel-11 Carrier Aggregation, a small cell could generally be configured to a UE by the macro eNB. Thus, it could be expected that the macro eNB and the small cell eNB need to exchange some information for the small cell configuration and operation (such as security configuration, physical configuration, MAC configuration, RLC configuration, and/or PDCP configuration). Also, the macro eNB would need to forward some information sent from the UE to the small cell eNB for small cell configuration/reconfiguration and operation (such as UE capability, UE assistance information, and in device coexistence indication, etc.).

In addition to the above information, it would be beneficial for the macro eNB to send a measurement gap configuration (as discussed in 3GPP TS 36.331 V11.2.0) allocated for the UE to the small cell eNB so that the small cell eNB could take measurement gaps into consideration when scheduling resources to the UE. For example, the small cell eNB could avoid scheduling the UE during measurement gaps because the UE cannot transmit or receive any signal to/from the small cell during the measurement gaps.

Figure 5:
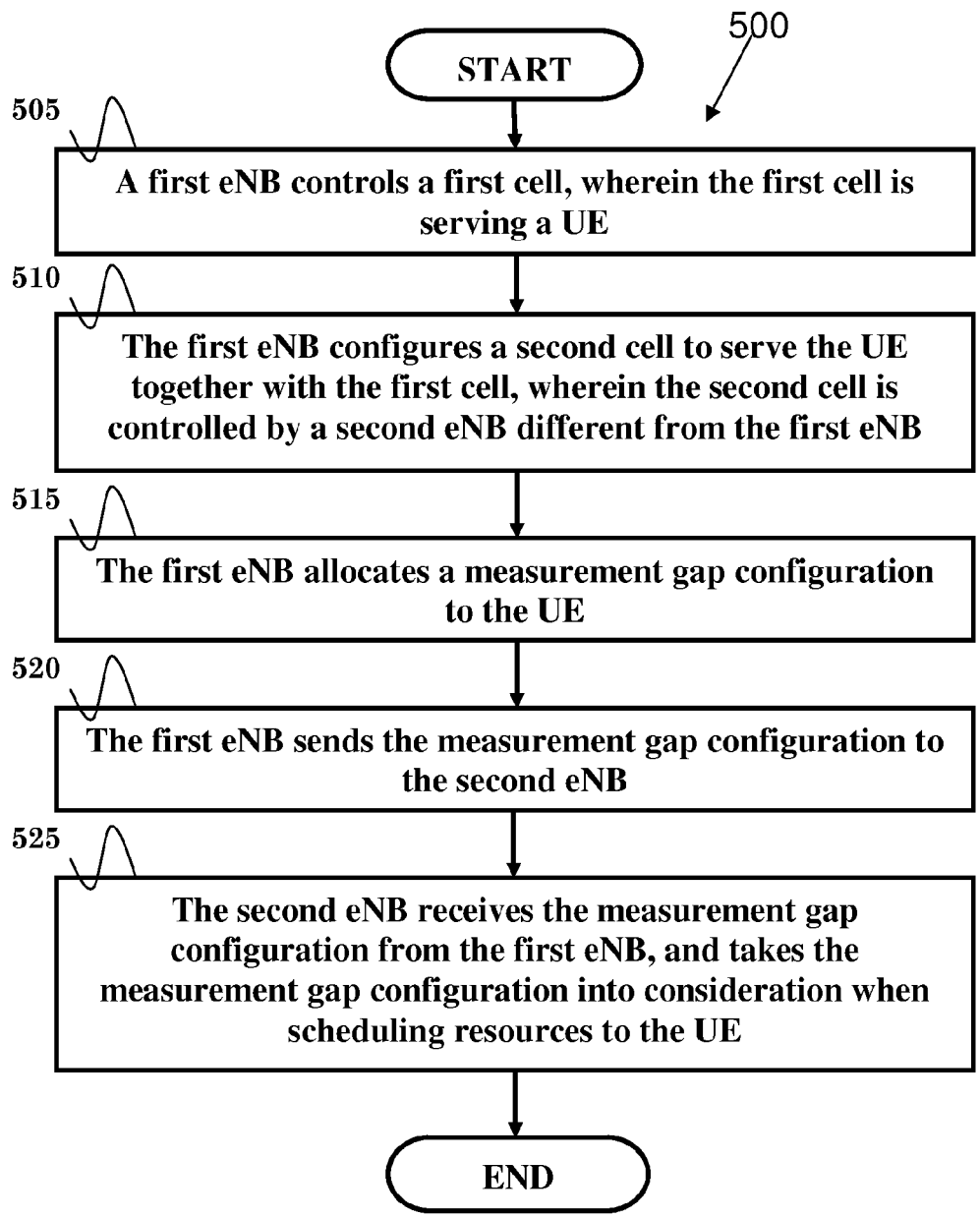
FIG. 5 illustrates a flow chart according to one exemplary embodiment.

FIG. 5 is a flow chart 500 in accordance with one exemplary embodiment. In step 505, a first eNB controls a first cell that serves a UE. In step 510, the first eNB configures a second cell to serve the UE together with the first cell. The second cell is controlled by a second eNB that is different from the first eNB. Also, the second cell could be configured to the UE via a Radio Resource Control (RRC) message (such as a RRC Connection Reconfiguration message) from the first eNB.

In step 515 of FIG. 5, the first eNB allocates a measurement gap configuration to the UE. In one embodiment, the measurement gap configuration could indicate a measurement gap pattern to be applied in the UE for performing measurements. In step 520, the first eNB sends the measurement gap configuration to the second eNB.

In one embodiment, as shown in step 525 of FIG. 5, the second eNB receives the measurement gap from the first eNB, and takes the measurement gap configuration into consideration when scheduling resources to the UE. In this embodiment, the resources could be downlink assignments and/or uplink grants.

Referring back to FIGS. 3 and 4, in one embodiment, the device 300 could include a program code 312 stored in memory 310 to implement small cell enhancements. In one embodiment, the CPU 308 could execute the program code 312 enable a first eNB (i) to control a first cell, wherein the first cell is serving a UE, (ii) to configure a second cell to serve the UE together with the first cell, wherein the second cell is controlled by a second eNB different from the first eNB, (iii) to allocate a measurement gap configuration to the UE, and (iv) to send the measurement gap configuration to the second eNB. In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for supporting dual connectivity in a wireless communication system, wherein separate eNBs (evolved Node B) are used to support dual connectivity, comprising:
   a first eNB controls a first cell, wherein the first cell is serving a UE (User Equipment); and
   the first eNB configures a second cell to serve the UE together with the first cell, wherein the second cell is controlled by a second eNB;
   the first eNB allocates a measurement gap configuration to the UE; and
   the first eNB sends the measurement gap configuration to the second eNB so that the second eNB could take measurement gaps into consideration when scheduling resources to the UE.

2. The method of claim 1, wherein the measurement gap configuration indicates a measurement gap pattern to be applied in the UE for performing measurements.

3. The method of claim 1, wherein the second cell is configured to the UE via a Radio Resource Control (RRC) message (such as a RRC Connection Reconfiguration message) from the first eNB.

4. A communication device for supporting dual connectivity in a wireless communication system, wherein separate eNBs (evolved Node B) are used to support dual connectivity, the communication device comprising:
   a control circuit;
   a processor installed in the control circuit;
   a memory installed in the control circuit and operatively coupled to the processor;
   wherein the processor is configured to execute a program code stored in memory to implement small cell enhancements by:
      controlling a first cell via a first eNB, wherein the first cell is serving a UE (User Equipment); and
      configuring, via the first eNB, a second cell to serve the UE together with the first cell, wherein the second cell is controlled by a second eNB;
      allocating, via the first eNB, a measurement gap configuration to the UE; and
      sending, from the first eNB, the measurement gap configuration to the second eNB so that the second eNB could take measurement gaps into consideration when scheduling resources to the UE.

5. The communication device of claim 4, wherein the measurement gap configuration indicates a measurement gap pattern to be applied in the UE for performing measurements.

6. The communication device of claim 4, wherein the second cell is configured to the UE via a Radio Resource Control (RRC) message (such as a RRC Connection Reconfiguration message) from the first eNB.

7. A method for supporting dual connectivity in a wireless communication system, wherein separate eNBs (evolved Node B) are used to support dual connectivity and a UE (User Equipment) is served by a first cell controlled by a first eNB, comprising:
   a second eNB controls a second cell, wherein the second cell is configured by the first eNB to serve the UE together with the first cell; and
   the second eNB receives a measurement gap configuration from the first eNB so that the second eNB could take measurement gaps into consideration when scheduling resources to the UE, wherein the measurement gap configuration was allocated by the first eNB to the UE.

8. The method of claim 7, further comprises:
   the second eNB takes the measurement gap configuration into consideration when scheduling resources to the UE.

9. The method of claim 8, wherein the resources contain downlink assignments and/or uplink grants.

10. The method of claim 7, wherein the measurement gap configuration indicates a measurement gap pattern to be applied in the UE for performing measurements.

11. The method of claim 7, wherein the second cell is configured to the UE via a Radio Resource Control (RRC) message (such as a RRC Connection Reconfiguration message) from the first eNB.

* * * * *